US 8,560,629 B1

(12) United States Patent
Bhatti et al.

(10) Patent No.: US 8,560,629 B1
(45) Date of Patent: Oct. 15, 2013

(54) METHOD OF DELIVERING CONTENT IN A NETWORK

(75) Inventors: Nina Bhatti, Mountain View, CA (US); Susie Wee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1812 days.

(21) Appl. No.: 10/423,540

(22) Filed: Apr. 25, 2003

(51) Int. Cl.
*G06F 15/16* (2006.01)

(52) U.S. Cl.
USPC ........... 709/217; 709/204; 348/466; 348/700; 725/52; 725/32; 725/37; 386/248; 386/251; 717/176; 717/177

(58) Field of Classification Search
USPC .............. 709/217, 247, 246, 204; 725/27, 87, 725/93–96; 370/17, 94.2
See application file for complete search history.

(56) References Cited

U.S. PATENT DOCUMENTS

| | | | |
|---|---|---|---|
| 5,535,407 A * | 7/1996 | Yanagawa et al. | 705/39 |
| 5,808,607 A * | 9/1998 | Brady et al. | 715/756 |
| 6,215,441 B1 * | 4/2001 | Moeglein et al. | 342/357.01 |
| 6,701,528 B1 * | 3/2004 | Arsenault et al. | 725/89 |
| 6,889,385 B1 * | 5/2005 | Rakib et al. | 725/119 |
| 6,914,903 B1 * | 7/2005 | Miyazaki et al. | 370/389 |
| 7,237,250 B2 * | 6/2007 | Kanojia et al. | 725/36 |
| 7,251,413 B2 * | 7/2007 | Dow et al. | 386/248 |
| 7,735,104 B2 * | 6/2010 | Dow et al. | 725/52 |
| 7,765,574 B1 * | 7/2010 | Maybury et al. | 725/105 |
| 8,155,498 B2 * | 4/2012 | Dow et al. | 386/221 |
| 2002/0066106 A1 * | 5/2002 | Kanojia et al. | 725/87 |
| 2003/0202772 A1 * | 10/2003 | Dow et al. | 386/46 |
| 2003/0202773 A1 * | 10/2003 | Dow et al. | 386/46 |
| 2004/0039979 A1 * | 2/2004 | Garani | 714/752 |
| 2004/0068622 A1 * | 4/2004 | Van Doren et al. | 711/146 |
| 2004/0152054 A1 * | 8/2004 | Gleissner et al. | 434/156 |
| 2004/0221311 A1 * | 11/2004 | Dow et al. | 725/52 |

* cited by examiner

*Primary Examiner* — Jude Jean Gilles

(57) ABSTRACT

A method of delivering content in a network, comprising receiving introductory segments of high user-activity content, and storing the introductory segments of high user-activity content prior to receiving a request for this high user-activity content from an end-user.

25 Claims, 4 Drawing Sheets

METHOD OF DELIVERING CONTENT IN A NETWORK

TECHNICAL FIELD

Embodiments of the present invention pertain to delivering content in a computer network. More particularly, embodiments of the present invention pertain to a method and system for receiving and storing introductory segments of high user-activity content in a network prior to receiving a request for such content from an end-user.

BACKGROUND ART

An important objective in delivering content in a network is to deliver highly desired segments of contents on a timely basis, preferably immediately and without latency. For the purposes of describing embodiments of the present invention, a network is any type of communication network including, without limitation, the Internet, intranets, a mobile wireless network, a wired network, a wireless network, a metropolitan area network, a local area network and a 3G mobile wireless network and any combinations of such networks. Latency is the time delay between the end-user inputting a request for content from a network and receiving a reply from the network. A segment is a portion of an original content, smaller in size and/or duration than the original content.

For the purposes of describing embodiments of the present invention, content includes multimedia data (also referred to herein as media data or media content) as exemplified by video data accompanied by audio data. In common terms, a multimedia data may be a movie with soundtrack, audio-based data, image-based data, Web page-based data, graphic data and the like, and any combinations thereof. Content may include data that is or is not encoded (compressed), encrypted or transcoded. For purposes of clarity and brevity, the following discussions and examples sometimes deal specifically with video data; however, the embodiments of the invention are not limited to use with video data but embrace all content.

In delivering content on networks, four end-user behavior patterns have been observed. Firstly, it has been observed that some contents are requested more frequently than others. For the purposes of describing embodiments of the present invention these content are referred to as "high user-activity content".

Secondly, it has been observed that even with high user-activity content, when content is received by the end-user, only the beginning portion of the content are viewed. For the purposes of describing embodiments of the present invention these segments are referred to as "introductory" (or "leading" or "hot") segments.

Thirdly, after viewing the introductory segments of high user-activity content, the end-user may decide to view additional segments, or abandon the content in its entirety at that stage.

Fourthly, the abandonment rate after viewing the introductory segments is high.

In managing content on a network, caching of content in the network is a known technique for expediting delivery of content to end-users. Caching is the placement in the network of "edge servers", also referred to as caching proxies or caches, closer to the end-user. By placing content in edge servers, the data-path length between the server and the end-user is shortened, thus shortening the wait-time between requesting content and receiving a reply, i.e., latency is shortened. Further, by placing the content in edge servers, the load on the origin server is reduced because the origin server in not receiving every request. Hence, the origin server can service other requests more responsively as the requests for content can be handled by the edge server.

In the prior art, it has been the practice for caches in the network to cache the entire content in the original format as received from the content server, or cache the content in a transcoded format, also in its entirety. Transcoding is often necessary to cope with the variation in size of computers and other devices on the network. These devices can, for example, display Web pages and video streams, playback stored audio, and/or make any network connection that a device on the network can make. Usually, a transcoding proxy is used to transform content, originally formulated for a full-size display, to content more appropriate to form factors for a wide range of devices. For example, the transcoding proxy can take the original content from the content server and change it to accommodate screen size, data rates of transmission, or any other transformation that is appropriate.

Caching contents in their entirety in edge servers works well when the size of the content is relatively small compared to the storage capacity of the edge servers. For example, a Web page which is relatively small (at much less than a megabyte in size), can be easily cached without consuming a substantial portion of the storage capacity.

However, caching contents in its entirety in the edge servers is problematic when the content is large compared to the storage capacity, and/or the content has a long playback time, e.g. multimedia data. Thus, transcoding and caching multimedia data such as DVD videos in their entirety in an edge server is not practical as the content will quickly consume the limited storage capacity.

The problem of caching large content in its entirety in a edge server is exacerbated when considering that, typically, a multiplicity of different content objects are needed to be cached, each possibly having multiple versions. Different versions may exist because of the need to accommodate a variety of network connections utilized by end-users. In addition, different versions may exist to accommodate the different capabilities of different types of client devices (e.g., desktops, laptops, personal digital assistants, cell phones, etc.). Also, different classes of devices typically have different processing and display capabilities. For example, while a personal digital assistant can receive and display a streamed video, it does not have the processing and display capabilities of a desktop. Accordingly, a reduced bitrate/reduced resolution version of the video is produced for use on the personal digital assistant, while a higher bit rate and higher resolution version is produced for the desktop.

Further, caching large content in its entirety in an edge server, whether in an original or transcoded format, is not an efficient use of cache storage especially if the content is not a high user-activity content, also if the rate of abandoning the content is high, which is typically the case, as previously noted.

Accordingly, there is a need for a more efficient way of caching and expediting delivery of content in a network.

DISCLOSURE OF THE INVENTION

A method of delivering content in a network, comprising receiving introductory segments of high user-activity content, and storing the introductory segments of high user-activity content prior to receiving a request for this high user-activity content from an end-user.

BRIEF DESCRIPTION OF THE DRAWINGS

The following Figures, which are incorporated in and form a part of this specification, illustrate embodiments of the invention. Together with the description, they serve to explain the principles of the invention.

Figure 1:
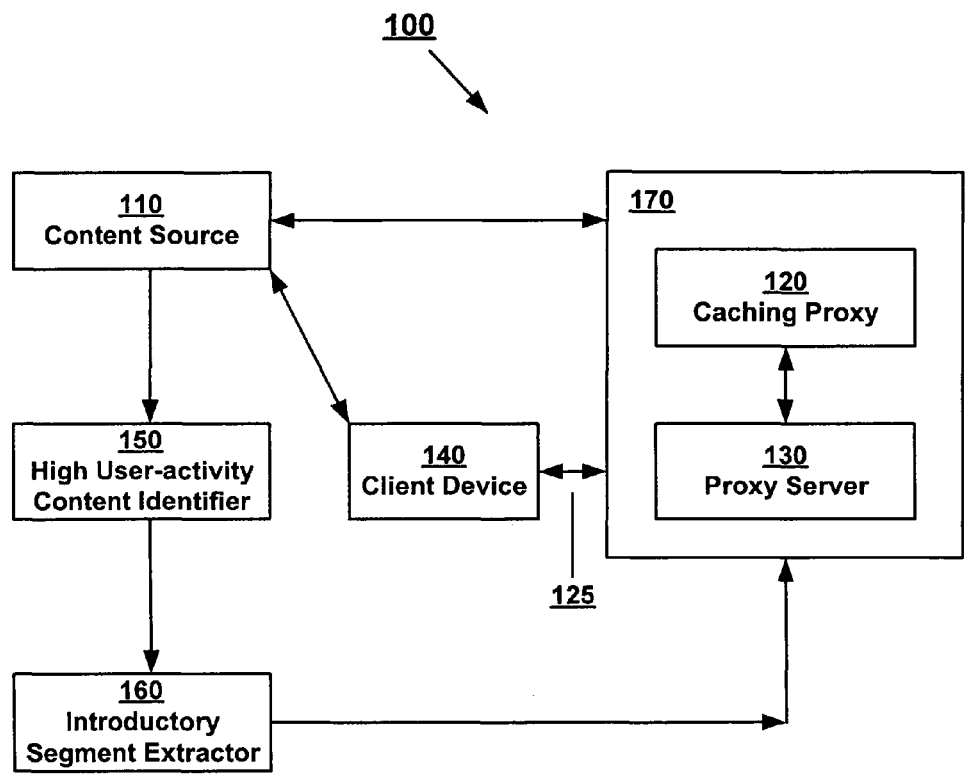
FIG. 1 is a block diagram illustrating a system for delivering introductory segments of transcoded high user-activity content in a network according to one embodiment of the present invention.

The drawings referred to in this description should not be understood as being drawn to scale except if specifically noted.

BEST MODE FOR CARRYING OUT THE INVENTION

Reference is now made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents which are included within the spirit and scope of the invention as defined by the appended claims. Further, in the following description of the present invention, specific details are set forth to provide a thorough understanding of the present invention. In other instances, well-known methods, procedures, components, and circuits have not been described in detail to avoid obscuring aspects of the present invention.

The embodiments of the present invention are well suited for use with multimedia data in a network such as video-based data, audio-based data, image-based data, Web page-based data, graphics data and the like that are generally referred to herein as media data, multimedia data, content, or content objects. For purposes of clarity and brevity, the following discussion and examples sometimes deal specifically with video data; the embodiments of the present invention, however, are not limited to use with video data.

In overview, embodiments of the present invention provide a method and system for reducing latency in a network by storing introductory segments of high user-activity content prior to receiving a request for the content. In one embodiment, items of high user-activity content comprising multimedia data (for example a DVD-quality video) are identified and segmented according to segmentation characteristics described, for example, in co-pending, commonly-owned U.S. patent application Ser. No. 10/195,078 filed Jul. 12, 2002 by J. G. Apostolopoulos et al., and entitled: "Storage and Distribution of Segmented Media Data", portions of which are reproduced herein. Other methods of segmenting multimedia data in accordance with the present invention can also be used.

Once segmented, those segments that are characterized as being introductory segments of high user-activity content in a network are cached (stored) by, for example, the method set forth in co-pending, commonly-owned U.S. patent application Ser. No. 10/300,246 filed Nov. 19, 2002 by Bo Shen et al., and entitled: "Transcoding-Enabled Caching Proxy and Method Thereof", portions of which are reproduced herein. Other methods of caching segmented multimedia data in accordance with the present invention can also be used.

Thus, with the present invention, instead of storing the entire item of content in the network as in the prior art, only introductory segments of high user-activity content are stored. As noted previously, an introductory segment is the beginning portion of a high user-activity content. High user-activity content includes, but is not limited to, content in popular demand, content frequently selected and frequently dropped after initial viewing and content seldom selected and frequently dropped after initial viewing. Examples of high user-activity content includes multimedia items of content such as a movie with soundtrack, audio-based data, image-based data, Web page-based data, graphic data and the like, and combinations thereof. High user-activity content may include data that is or is not encoded (compressed), encrypted or transcoded.

With the present invention, on receiving a request for a high user-activity content, the introductory segments of high-user activity content in cache can be immediately delivered, while remaining portions of the content, if required, are accessed from a more distant content server, transcoded if necessary, and delivered to the end-user while masking or hiding the actual transmission delays. Thus, embodiments of the present invention provide for a faster delivery of high user-activity content and a more efficient use of available cache storage in the network.

FIG. 1 illustrates an exemplary network or system 100 for receiving and storing introductory segments of high user-activity content according to one embodiment of the present invention. It will be appreciated that system 100 may include elements other than those shown. System 100 may also include more than one of the various elements shown. The functionality of each of these elements is discussed below and it will be appreciated that these elements may have functionality other than that discussed. As will be appreciated, portions of the present method and system are comprised of a computer-readable and computer-executable instructions which reside, for example, on a computer media of a computer system.

In FIG. 1, the various elements of system 100 are in communication with each other as illustrated. In this embodiment, content source 110 communicates with caching proxy 120 and proxy server 130 (shown as components of a single unit 170) which are in communication with client device 140 via communication channel 125. Typically, caching proxy 120 and proxy server 130 are deployed at the edge of the network to reduce traffic to and from content source 110, and to also reduce latency as perceived by client device 140. In one embodiment, caching proxy 120 can incorporate the functionality of proxy server 130 and function as a transcoder as well as a caching unit in edge server unit 170 as shown in FIG. 1; in other embodiments caching proxy 120 and proxy server 130 are separate units.

Client device 140 may be a computer system (such as a laptop, desktop or notebook), a hand-held device (such as a personal digital assistant), a cell phone, or another type of device that provides the capability for end-users to access and execute (e.g., display) items of content. Furthermore, many client devices may access caching proxy 120 and proxy server 130. In a heterogeneous network, each of these many client devices may have different attributes or profiles. These attributes include, but are not limited to, the display, power, communication and computational capabilities and characteristics of the various client devices.

Also shown in FIG. 1 is a high user-activity content identifier 150 in communication with content source 110 for identifying high user-activity content. In one embodiment, high user-activity content identifier 150 identifies high user-activity content in the network by utilizing a variety of known prior art methods. Such methods typically analyze historical and current request patterns for content in the network to determine usage patters and tends. Also, such content can be identified by monitoring end-user consumption patterns for content in the network, and the abandonment rate patterns for content in the network after the content is viewed by the end-user. Since high user-activity content identification methods are well known in the art the details on how they can be used to identify high user-activity content in a network are not included here for purposes of brevity and clarity.

Once high user-activity content are identified, an introductory segment extractor 160 in communication with high user-activity content identifier 150 is used to identify and extract introductory segments of high activity user-activity content for caching in caching proxy 120. Segment extraction can be accomplished in accordance with segmentation characteristics described by the method herein and illustrated schematically in FIG. 3, or by other well-known segmentation methods. Because each item of segmented content is typically smaller in size and/or duration than an item of content in its entirety, more (different) items of content can be segmented and representatively stored in caching proxy 120 of FIG. 1.

Communication may occur directly between elements, or indirectly through an intermediary device or node (not shown). Also, communication may be wired or wireless, or a combination of wired and wireless. In one embodiment, communication occurs over the World Wide Web (or Internet); in another embodiment communication occurs over a mobile wireless network such as a 3G network. There may actually be many communication channels downstream of caching proxy 120 and proxy server 130. In a heterogeneous network, each of these communication channels (exemplified by communication channel 125) may have different attributes. For example, one channel may be characterized as having a higher bandwidth (higher data transfer rate) than another channel.

Figure 2:
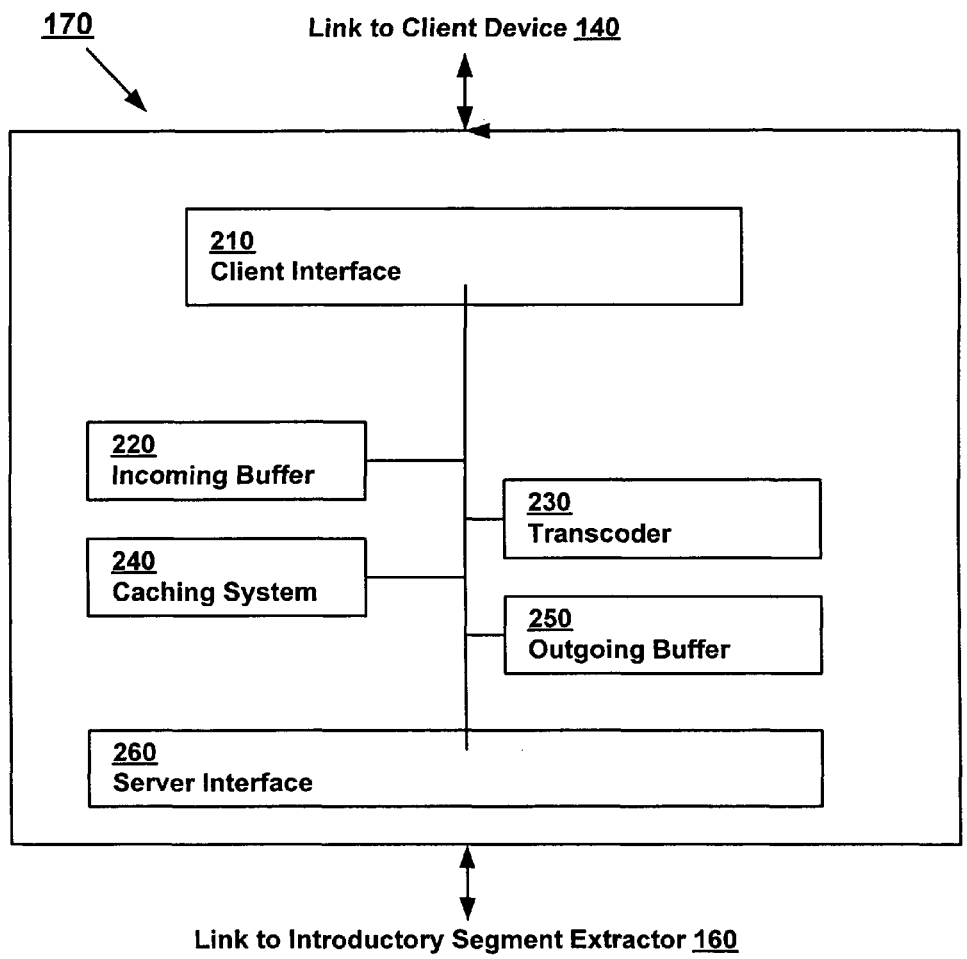
FIG. 2 is a block diagram illustrating the functional elements provided by a caching proxy in a network in accordance with one embodiment of the present invention.

FIG. 2 is a block diagram showing exemplary functional elements provided by a caching proxy 120 and proxy server 130 for receiving and storing introductory segments of high user-activity content in accordance with one embodiment of the present invention. For convenience in describing the present embodiment it is assumed that caching proxy 120 includes the functionality of proxy server 130; however it should be noted that caching proxy 120 and proxy server 130 may exist as separate entities within unit 170. In the present embodiment, caching proxy 120 includes a client interface 210, an incoming buffer 220, a transcoder 230, a caching system 240, an outgoing buffer 250, and a server interface 260. These elements are rendered separately for clarity of illustration and discussion.

In the present embodiment, client interface 210 allows caching proxy 120 to act as a client to content source 110. In one embodiment, client interface 210 acts as an HTTP (HyperText Transfer Protocol) client or as an RTP/RTSP (Real Time Protocol/Real Time Streaming Protocol) client. In a somewhat similar manner, server interface 260 allows caching proxy 120 to act as a server to the end-user (e.g., client device 130). In one embodiment, server interface 260 acts as an HTTP client or as an RTP/RTSP client. Other protocols can be used with client interface 210 and server interface 260.

In the present embodiment, caching proxy 120 functions as follows. Streamed content is received over the link (or uplink) from content source 110. The content may or may not be compressed (encoded). The content may or may not be encrypted. The received stream (specifically, some portion of the received stream) may be buffered in incoming buffer 220, cached in caching system 240, or sent directly to transcoder 230. The received stream may also be sent over the link (or downlink) to client device 140 via client interface 210.

For the case in which the received stream is buffered, transcoder 230 will pull bits from incoming buffer 220 for transcoding. Transcoder 230 may also retrieve cached objects from caching system 240 for transcoding. Transcoded bits may be sent from transcoder 230 to caching system 240, to outgoing buffer 250, or to server interface 260. Caching proxy 120 can make a decision whether to cache a content object either from incoming buffer 220, outgoing buffer 250, or from transcoder 230 (as the transcoded version is produced). Server interface 260 can also receive transcoded bits from outgoing buffer 250 or from caching system 240 (either directly or via outgoing buffer 250).

Media data such as a video stream may take a number of different routes through caching proxy 120 depending, for example, on the speed of the uplink, the downlink, and/or the transcoder 230. A number of different streams may be processed in parallel by caching proxy 120. While processed in parallel, one stream may be at one stage of processing, while another steam may be at a different stage.

The sizes of the incoming buffer 220 and the outgoing buffer 250 can be small because transcoder 230 will process content in a streamlined fashion. Transcoding may be required to convert the content from a higher bitrate to a lower bitrate, or from a higher resolution to a lower resolution, or a combination of both. Any of various transcoding schemes may be used by transcoder 230. In one embodiment, a compressed domain transcoding approach known in the art is used. In compressed domain transcoding, the incoming video (which is typically encoded) is only partially decoded (de-compressed). Rate adapting is performed in the compressed domain while the motion information is reused. Compressed domain transcoding can considerably improve transcoding speed relative to other approaches in which the video is decoded, transcoded and then re-encoded. Furthermore, the present invention is also well suited to providing the introductory segments of the high-user activity content in various other formats which may be desirable to the end-user.

To summarize to this point, caching proxy 120 is useable for performing transcoding as well as caching in a network, thus allowing for content transcoding to be performed and for the content to be stored closer to the end-users in the network. Caching proxy 120 can transcode content objects into different versions (or variants) in order to satisfy end-user needs in a heterogeneous network (that is, a network composed of client devices that have different attributes and/or different types of communication channels). Depending on the type (e.g., speed) of the connection with a client device 140, as well as the attributes of the client device 140, caching proxy 120 can (if necessary) transcode a content object that is either received from content source 110 or from caching system 240, and deliver the appropriate version of the content object to the client device 140.

Figure 3:
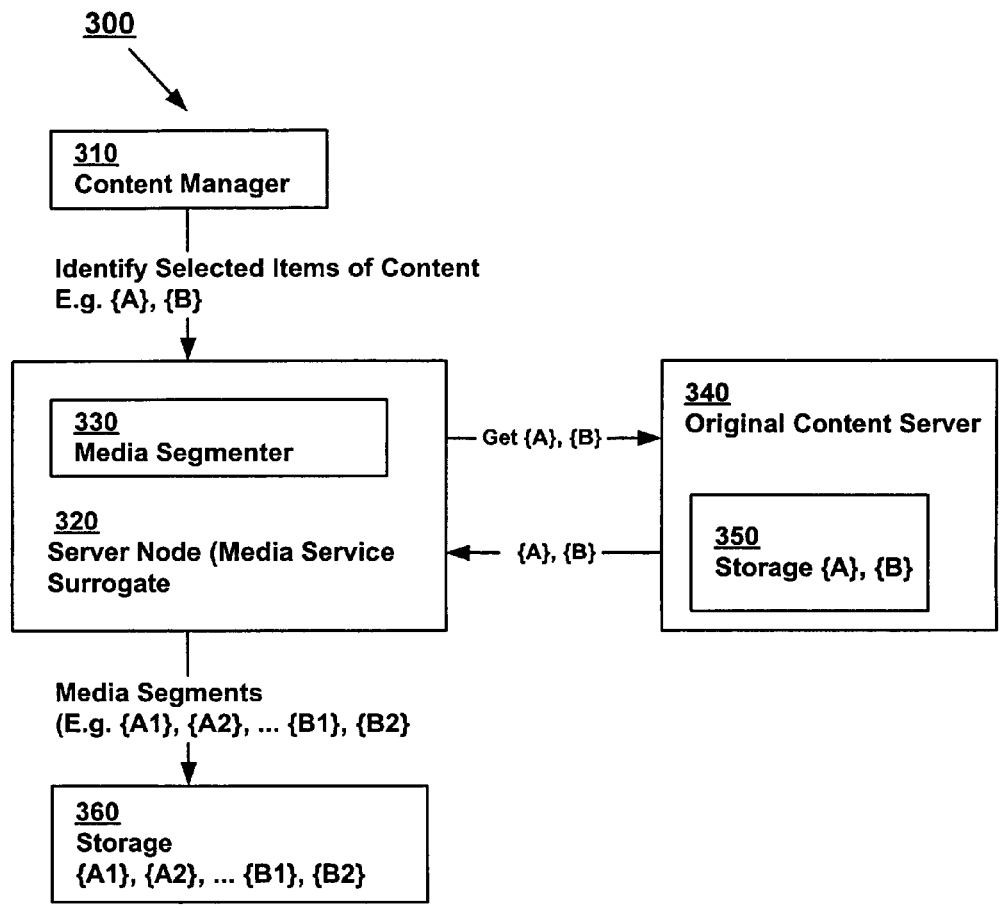
FIG. 3 is a block diagram of an exemplary architecture for segmenting high user-activity content into introductory segments of transcoded high user-activity content in a network according to one embodiment of the present invention.

Regarding segmenting high user-activity content and identifying introductory segments of such high user-activity contents in accordance with the present invention, FIG. 3 is a block diagram of an exemplary architecture 300 suitable for segmenting items of media content. The architecture 300 as shown in FIG. 3 can include additional elements. These elements may be used to store and distribute media data as well as encrypt/decrypt, compress/decompress (encode/decode), and/or transcode that data. It will be appreciated that functions described as being performed by multiple elements may instead be performed by a single element. Similarly, it will be appreciated that multiple functions described as being performed by a single (multifunctional) element may instead be divided in some way amongst a number of individual elements.

With reference to FIG. 3, architecture 300 includes content manager 310 in communication with server node 320. Server node 320 may also be known as a media service surrogate. Server node 320 includes media segmenter 330. Server node 320 may have the functionality to encrypt/decrypt, compress/decompress, and/or transcode data. Server node 320 is communicatively coupled to storage 360 and original content server 340. Original content server 340 includes storage 350. Original content server 340 may also have the functionality to encrypt/decrypt, compress/decompress, and/or transcode data. The elements of architecture 300 may be combined; for example, storage 360 may be incorporated into server node 320, media segmenter 330 may reside on original content server 340, and the like.

Each of the elements of architecture 300 may communicate over a wired or wireless network, or over a hybrid network that includes both wired and wireless portions. Although content manager 310 is shown as communicating with server node 320, it may also communicate directly with original content server 340. Furthermore, content manager 310 is in communication with other server nodes.

In one embodiment, architecture 300 of FIG. 1 is used as follows. Content manager 310 directs media segmenter 330 to segment a particular item of content or a number of such items. For simplicity, only two items of content, referred to as A and B, are discussed; however, it is appreciated that any number of items of content may be utilized. Items of content may include items such as movies or live events that have been captured and recorded, or live events that are to be distributed in real time.

Items of content in a network may be differentiated from each other in many different ways. For example, content A may be one movie (one title) and content B another movie (a different title). Alternatively, contents A and B may each be the same movie (same title), but with different characteristics according to the different attributes of downstream (client) devices. Client devices may have different display, power, computational, and communication characteristics and capabilities. Thus, for example, content A may be a movie formatted (e.g., transcoded) for one type of receiving (client) device, and content B may the same movie formatted for another type of client device.

For each item of content, content manager 310 provides information identifying the item (e.g., the item's name) and its location (a Uniform Resource Locator, for example). Also, content manager 310 provides information about how the segmentation is to be performed. For example, content manager 310 may specify the number of segments, the size of each segment, and/or the duration (in time) of each segment.

In the present embodiment, in response to the direction provided by content manager 310, media segmenter 330 requests the specified items of content from original content server 340. Original content server 340 retrieves the requested items of content from storage 350 and sends them to media segmenter 330 (that is, to server node 320). It should be noted that content manager 310 could instead communicate directly to original content server 340, and as such could direct original content server 340 to send particular items of content to media segmenter 330. Also, media segmenter 330 may request/receive the entire item of content or some portion thereof. Furthermore, in the case of real-time content delivery (of a live event, for example), media segmenter 330 may directly receive the real-time video feed.

Media segmenter 330 segments the item(s) of content. For simplicity of discussion and illustration, the segmented data for item of content A are represented as media segments {A1}, {A2}, etc., and the segmented data for item of content B are represented as media segments {B1}, {B2}, etc. Content A may be one item of content and content B another item of content, or content A and content B may correspond to the same item of content but with different characteristics for use with different client devices having different attributes and capabilities.

Consider an example in which content A is encoded at a first bit rate and content B is encoded at a second bit rate (this discussion is also applicable to other attributes such as spatial resolution, etc.). In that case, a switch can be made from one bit rate to another at the segment boundaries. That is, a requesting device may receive media segment A1 followed by media segment B2. This may be useful for time-varying channels or when there is a portion of content that an end-user would like to see with higher quality relative to another portion of content.

In one embodiment, the segmented data are stored in storage 360. Although a single storage 360 is shown, it is appreciated that there may be any number of such storage elements. Each of these storage elements may be populated with the same or with different segmented items of content.

In an alternate embodiment, the segmented data are sent directly to various server nodes in the network. In addition to or as an alternative to storing the segmented data in storage 360. For example, in the case of a real-time event that is known to be popular and thus will likely be accessed by a large number of end-users in real time, segmented content can be directly distributed to server nodes that in turn forward the segmented data (media segments) to requesting client nodes.

Figure 4:
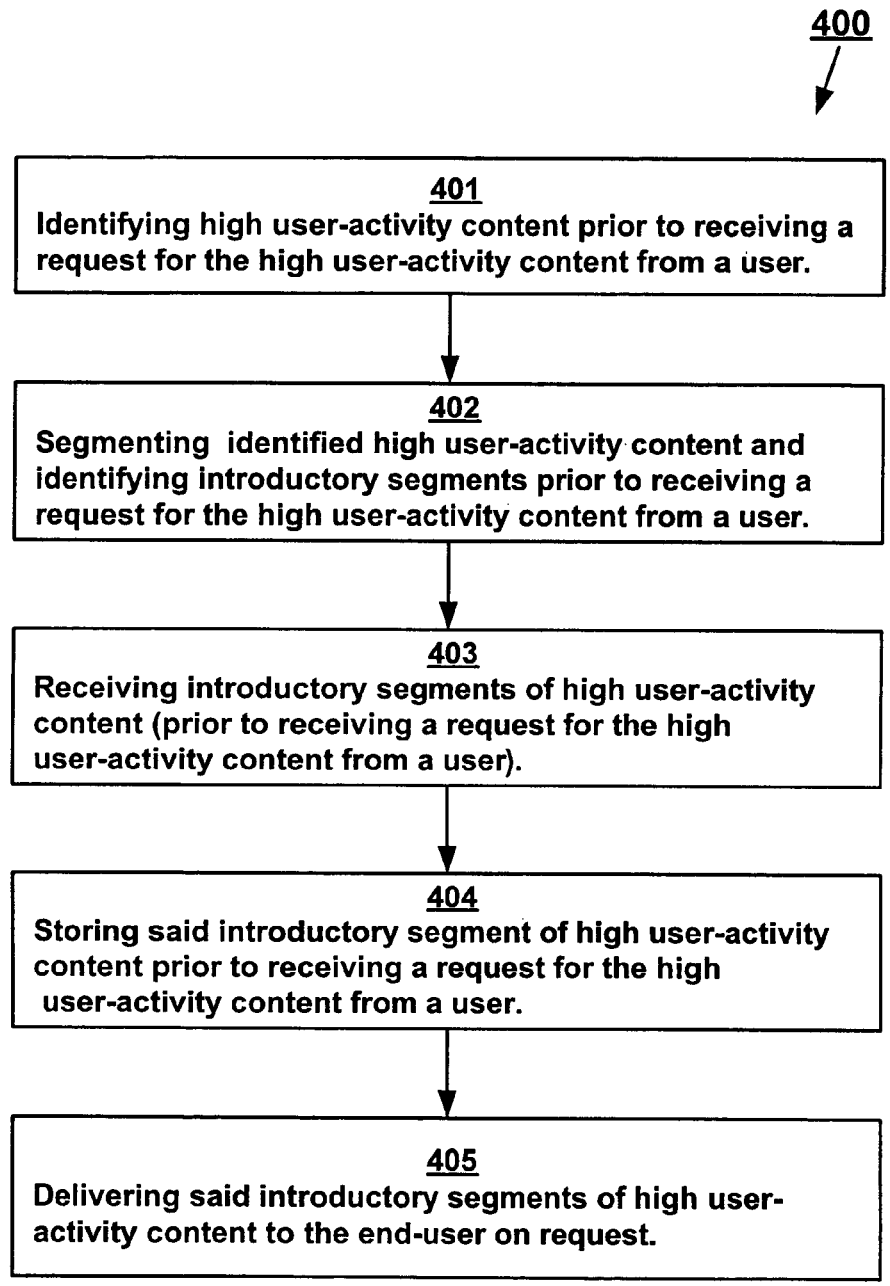
FIG. 4 is a flowchart of a method of receiving and storing introductory segments of high user-activity content in a network according to one embodiment of the present invention.

FIG. 4 is a flowchart 400 a method delivering content in a network, comprising receiving introductory segments of high user-activity content, and storing the transcoded introductory segments of high user-activity content prior to receiving a request for the high user-activity content from an end-user, in accordance with an embodiment of the present invention. Although specific steps are disclosed in flowchart 400, such steps are exemplary. That is, embodiments of the present invention can be performed by various other steps or variations of the steps recited in flowchart 400. It will be appreciated that the steps in flowchart 400 may be performed in an order different than presented, and that not all of the steps in flowchart 400 may be performed. All of, or a portion of, the method described by flowchart 400 may be implemented using computer-readable and computer-executable instructions which reside, for example, in computer-usable media of a computer system or like device. Generally, flowchart 400 is implemented by devices such as the caching proxy 120 of FIG. 1, utilizing the functional elements of FIG. 2 to transcode, store and deliver content, and the exemplary architecture 300 for segmenting media items as set forth in FIG. 3.

In step 401 of FIG. 4, in one embodiment of the invention, prior to receiving a request for high user-activity content in a network, such content is identified. As previously noted, identification of high user-activity content in a network can be accomplished by utilizing a variety of known prior art methods. Such methods typically analyze historical and current request patterns for content in the network to determine usage patters and tends. Also, such content can be identified by monitoring end-user consumption patterns for content in the network, and the abandonment rate patterns for content in the network after the content is viewed by the end-user.

In step 402 of FIG. 4, in one embodiment of the invention, prior to receiving a request for high user-activity content in a network, the identified high user-activity content in a network is segmented to identify introductory segments of high activity user-activity content. As previously noted, segmentation can be accomplished in accordance with segmentation characteristics described by the method herein and illustrated schematically in FIG. 3, or by other well-known segmentation methods. Because each item of segmented content is typically smaller in size and/or duration than an item of content in its entirety, more (different) items of content can be segmented and representatively stored in caching proxy 120 of FIG. 1. That is, instead of storing a relatively small number of large items of content in their entirety, a relatively large number of introductory segments of different items of contents are stored.

In step 403 of FIG. 4, in one embodiment of the invention, prior to receiving a request for high user-activity content in a network, the content is received in a cache in the network. If necessary, the content can be transcoded after receipt. Transcoding can be accomplished by the exemplary method described herein and illustrated in FIGS. 1 and 2, or by other well-known transcoding methods. It should be noted that in accordance with embodiments of the present invention, transcoding can occur at different points in time, for example, transcoding can occur before an end-user requests the content, or after the introductory segments of high user activity are received 403 in cache, or upon receiving a request for the content from an end-user after the high user-activity is stored 404 in cache.

In step 404 of FIG. 4, in one embodiment of the invention, the transcoded introductory segments of high user-activity content in the network are stored prior to receiving a request for the high user-activity content from a user. Storage can be provided by edge servers located close to the end-user or a client. By pro-actively placing the transcoded introductory segments of high-user activity content in edge servers, the data-path length between the server and the end-user is shortened, thus shortening the wait-time between a user entering a request for content and subsequently receiving a reply. In accordance with one embodiment of the invention, the storage in the network is searchable. That is, on receiving a request for high user-activity content from an end-user, the stored introductory segments of high user-activity content can be searched by well known search algorithms to determine whether a desired introductory segment of high-user content is available for immediate delivery. Also in accordance with another embodiment of the invention, when previously stored segments of high user-activity content in the network are no longer in high demand, those segments are removed from the cache and replaced by more current segments of high-user activity content.

In step 405 of FIG. 4, in one embodiment of the invention, introductory segments of transcoded high user-activity content in a network are delivered to the end-user upon receiving a request for such content. The transcoded segments of high user-activity content are delivered immediately upon request without waiting for the original content server to reply to the transcoding server, while the remaining segments of the content is retrieved from the server.

As will be appreciated, the present invention is well suited for use in any of a variety of wired and/or wireless networks serving mobile and non-mobile clients in various combinations thereof. In addition, the method and system of the present invention are also applicable if all the links are wireless, as is the case of an ad-hoc wireless network where some of the nodes are acting as servers and others are clients. A node may act both as a server (i.e. a source of information) or a client (an end-user of information) at the same time. With the present invention, since introductory segments of high user-content are cached in edge servers, these introductory segments can immediately be presented to the end-user upon receiving a request for this content. If the end-user is interested in viewing additional segments of the content after viewing the leading segments, the additional segments be accessed from a server, transcoded if necessary, and delivered to the end-user in a manner transparent to the end-user. Consequently, from the end-user's perspective, there is little or no delay in accessing the content.

In summary, embodiments of the present invention pertain to a method and system that providing a more efficient way of delivering high user-activity content in network to end-users. According to these embodiments—by identifying and transcoding introductory segments of high user-activity content prior to receiving a request for this content and storing the transcoded segments—the end-user is proactively provided with highly desired content on a timely basis.

Embodiments of the present invention are thus described. While the present invention has been described in particular embodiments, it should be appreciated that the present invention should not be construed as limited by such embodiments, but rather construed according to the following claims.

What is claimed is:

1. A method of delivering content in a network, comprising:
   a) receiving an introductory segment of high user-activity content at a first server, wherein said introductory segment of high user-activity content is content that is requested more frequently than other content and is extracted by an introductory segment extractor; and
   b) storing said introductory segment of high user-activity content at said first server prior to receiving a request for said high user-activity content from an end-user, wherein remaining portions of said high user-activity content are stored at a second server more distant to said end-user than said first server such that said introductory segment can be immediately delivered to said end-user.

2. The method of claim 1, wherein said introductory segment of high user-activity content is selected from the group consisting of multimedia data, leading segments, transcoded and non-transcoded content.

3. The method of claim 2, further comprising transcoding said non-transcoded introductory segment of high-user activity content after receiving said content.

4. The method of claim 2, further comprising transcoding said non-transcoded introductory segment of high-user activity after receiving a request for said content from an end-user.

5. The method of claim 2, wherein said introductory segment of high user-activity segments comprises content for use in a plurality of end-user devices selected from the group consisting of a computer, a cell-phone, a personal digital assistant, a desktop and a laptop computer.

6. The method of claim 2, wherein said introductory segment of high user-activity content comprises searchable segments of content.

7. The method of claim 3, wherein said transcoding of said introductory segments of high user-activity content is transcoding by an edge server.

8. The method of claim 1, wherein said storing of said introductory segment of high user-activity content is storing by an edge server.

9. The method of claim 8, wherein said storing introductory segments of high user-activity content is storing in a searchable storage of said edge server.

10. The method of claim 1, wherein said network is selected from the group consisting of a wired network, a wireless network, a mobile wireless network, a local area wireless, a metropolitan area network, the Internet and a 3G mobile wireless network.

11. The method of claim 1, further comprising the step of delivering said introductory segment of high user-activity content to an end-user immediately upon receiving a request for said high user-activity content from said end-user.

12. The method of claim 1, further including the step of retrieving at least one segment of said remaining portions of said high user-activity content from said second server for delivery to said end-user.

13. The method of claim 1, further comprising identifying said high user-activity content for storing, prior to receiving a request for said high user-activity content.

14. A computer system communicatively linked in a network to a caching proxy and a system for segmenting items of high user-activity content, said computer system comprising a processor for executing a method of delivering content in said network, said method comprising:
   a) receiving an introductory segment of high user-activity content at a first server, wherein said introductory segment of high user-activity content is content that is requested more frequently than other content and is extracted by an introductory segment extractor; and
   b) storing said introductory segment of high user-activity content at said first server prior to receiving a request for said high user-activity content from an end-user, wherein remaining portions of said high user-activity content are stored at a second server more distant to said end-user than said first server such that said introductory segment can be immediately delivered to said end-.

15. The computer system of claim 14, wherein said introductory segment of high user-activity content is selected from the group consisting of multimedia data, leading segments, transcoded and non-transcoded content.

16. The computer system of claim 14, wherein said introductory segment of high user-activity segments comprises content for use in a plurality of end-user devices selected from the group consisting of a computer, a cell-phone, a personal digital assistant, a desktop and a laptop computer.

17. The computer system of claim 14, wherein said introductory segment of high user-activity content comprises searchable segments of content.

18. The computer system of claim 14, wherein said storing of said introductory segment of high user-activity content is storing by an edge server.

19. The computer system of claim 14, wherein said network is selected from the group consisting of a wired network, a wireless network, a mobile wireless network, a local area wireless, a metropolitan area network, the Internet and a 3G mobile wireless network.

20. A computer-useable medium having computer readable code stored thereon for causing a computer system to perform a method of delivering introductory segments of high user-activity content in a network, said method comprising:
   a) receiving an introductory segment of high user-activity content at a first server, wherein said introductory segment of high user-activity content is content that is requested more frequently than other content and is extracted by an introductory segment extractor; and
   b) storing said introductory segment of high user-activity content at said first server prior to receiving a request for said high user-activity content from an end-user, wherein remaining portions of said high user-activity content are stored at a second server more distant to said end-user than said first server such that said introductory segment can be immediately delivered to said end-user.

21. The computer-useable medium of claim 20, wherein said introductory segment of high user-activity content is selected from the group consisting of multimedia data, leading segments, transcoded and non-transcoded content.

22. The computer-useable medium of claim 20, wherein said introductory segment of high user-activity segments comprises content for use in a plurality of end-user devices selected from the group consisting of a computer, a cell-phone, a personal digital assistant, a desktop and a laptop computer.

23. The computer-useable medium of claim 20, wherein said introductory segment of high user-activity content comprises searchable segments of content.

24. The computer-useable medium of claim 20, wherein said storing of said introductory segment of high user-activity content is storing by an edge server.

25. The computer-useable medium of claim 20, wherein said network is selected from the group consisting of a wired network, a wireless network, a mobile wireless network, a local area wireless, a metropolitan area network, the Internet and a 3G mobile wireless network.

* * * * *

UNITED STATES PATENT AND TRADEMARK OFFICE
CERTIFICATE OF CORRECTION

PATENT NO. : 8,560,629 B1
APPLICATION NO. : 10/423540
DATED : October 15, 2013
INVENTOR(S) : Nina Bhatti et al.

Page 1 of 1

It is certified that error appears in the above-identified patent and that said Letters Patent is hereby corrected as shown below:

In the Claims:

In column 11, line 34, in Claim 14, delete "end-." and insert -- end-user. --, therefor.

Signed and Sealed this
Eleventh Day of February, 2014

Michelle K. Lee
*Deputy Director of the United States Patent and Trademark Office*